P. DENISOW.
VELOCIPEDE.
APPLICATION FILED NOV. 1, 1921.
1,436,950.
Patented Nov. 28, 1922.
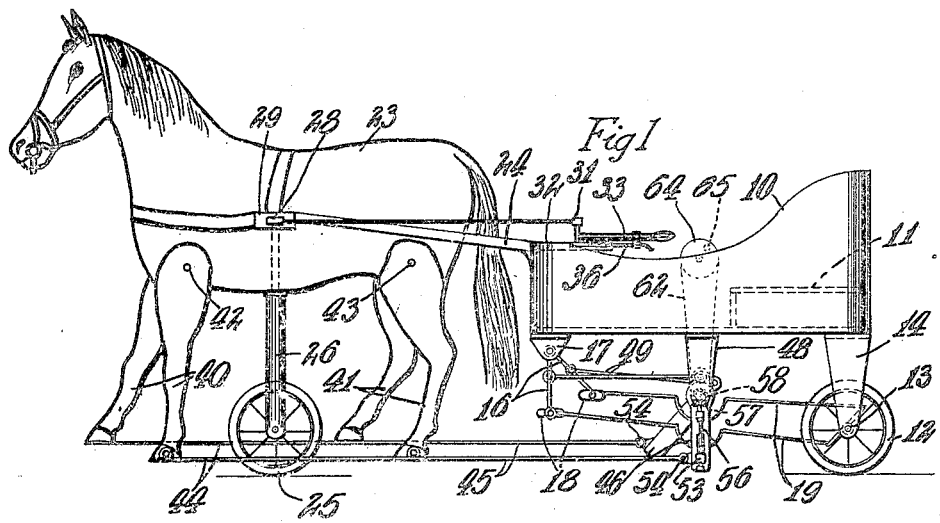
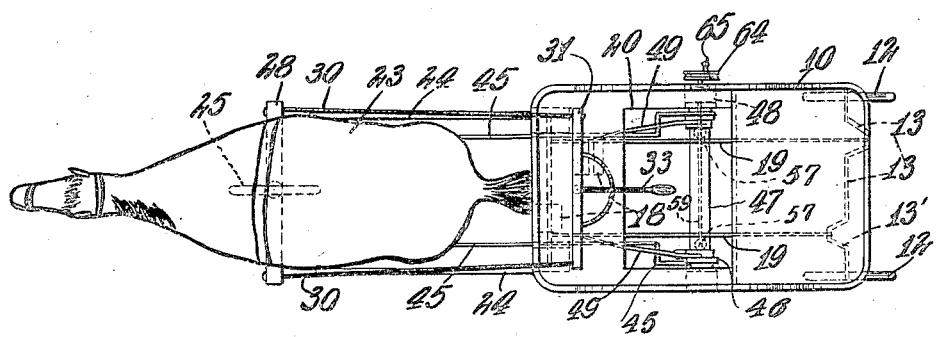
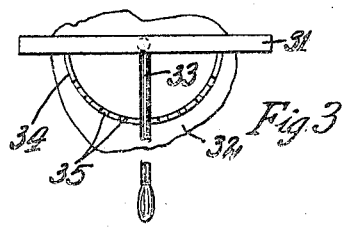
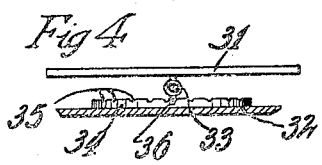
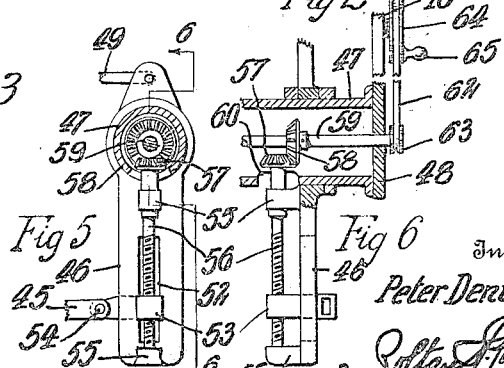
Inventor
Peter Denisow
By [signature]
Attorney Patented Nov. 28, 1922.

1,436,950

UNITED STATES PATENT OFFICE.

PETER DENISOW, OF RACINE, WISCONSIN.

VELOCIPEDE.

Application filed November 1, 1921. Serial No. 511,988.

*To all whom it may concern:*

Be it known that I, PETER DENISOW, citizen of Russia, residing at Racine, in the county of Racine and State of Wisconsin, have invented certain new and useful Improvements in Velocipedes, of which the following is a specification.

This invention relates generally to velocipedes, having more particular reference to a velocipede in which a horse or like draft animal is given the appearance of pulling a cart or like vehicle.

The invention has for a general object to provide a novel and simple device of this kind, and further to provide a means whereby the length of the strides seemingly taken by the horse may be varied as desired.

For further comprehension of the invention, and of the objects and advantages thereof, reference will be had to the following description and accompanying drawings, and to the appended claims in which the various novel features of the invention are more particularly set forth.

Fig. 1 of the drawing is a side view of a velocipede constructed according to the invention.

Fig. 2 is a plan view thereof.

Fig. 3 is a fragmentary plan view of the steering control device.

Fig. 4 is a rear elevation thereof.

Fig. 5 is a detail side view of one of the arms for moving the horse's legs, the shaft on which the arm is mounted being shown in transverse section.

Fig. 6 is a transverse vertical section on the line 6—6 of Fig. 5.

As here embodied my improved velocipede comprises a cart body 10 provided with a seat 11 and supported on wheels 12 fixed to a cranked drive shaft or axle 13 which is journaled in suitable bearings such as 14.

The shaft 13 is driven by a pair of oscillatory arms 16 suspended from brackets such as 17 under the cart body 10, and provided with foot pedals 18, these arms being connected by rods 19 to the crank elements 13′ of the shaft 13. The feet of the driver extend down through an opening 20 in the cart flooring.

In front of the cart body a horse 23 is located, being rigidly secured to the body 10 by shaft elements 24, this horse being supported by a wheel 25 journaled in the lower end of a post 26 which has a suitable rotative connection with the body of the horse and is disposed centrally thereunder. To direct the wheel 25 to one side or another for steering purposes, a cross bar 28 is fixed to the upper end of the post 26 and extends outwardly at opposite ends through a slot 29 in the horse's body, this bar 28 having attached to its ends a pair of ropes 30 which lead backwardly to a second cross bar 31 pivoted on a plate 32 fixed to the dashboard of the cart. An operating handle 33 is fixed to the cross bar 31. To enable the wheel to be retained in any desired position an arcuate rib 34 is fixed on the plate and provided with a number of notches 35 adapted to receive a resilient latch member 36 mounted on the operating handle 33.

The front and rear legs of the horse, which are numbered respectively 40 and 41, are pivotally attached at their upper ends, as indicated at 42 and 43, to the body of the horse, being arranged to have an oscillatory movement imparted thereto as the velocipede moves forward. As here shown the front and rear legs 40 and 41 are connected by a pair of links 44 while a second pair of links 45 lead backwardly from the rear legs 41 to connect to a pair of arms 46 loosely fulcrumed between their ends on a fixed tubular shaft 47 carried by brackets such as 48 depending from the cart body. The upper ends of these arms 46 are connected by links 49 to the arms 16 to receive oscillatory movement therefrom.

The links 45 are preferably connected to the arms 46 in a manner to have their connection points adjustable along the arms and to this end each arm is longitudinally slotted as at 52 to receive and guide a crosshead block 53 to which the link 45 is attached as at 54. Extending along arm 46, and suitably swiveled in bearing lugs 55 on the latter, is a screw 56 which is threaded through a suitable topped hole in the clock 53. Fixed to the upper end of the screw 56 is a bevel pinion 57 meshing with a bevel gear 58 fixed on a shaft 59 extending axially through the tubular shaft 47, which latter is provided with arcuate slots such as 60 to accommodate the pinions 57. Shaft 59 is adapted to be rotated by means of a belt 62 looped over suitable grooved pulleys 63, 64 fixed respectively thereon and on a suitable stub shaft journaled in the side of the cart body 10, sprocket wheel 64 having a crank handle 65 fixed thereto for purposes of rotation.

It is believed that the manner of operation and use of my improved velocipede will be readily understood from the above description. By oscillation of the arms 16, the wheels 12 are driven, while the legs of the animal are caused to oscillate back and forth on the body in resemblance to the actual running of a horse. By rotating crank handle 65 the crosshead 53 may be moved along the arms 46, thus varying the effective length of the latter and in consequence varying the degree of movement imparted to the legs 40, 41.

Having thus described my invention what I claim as new and desire to protect by Letters Patent of the United States is as follows:

1. A velocipede comprising a cart, an animal figure attached thereto and having its legs pivotally attached to its body, wheels supporting the cart and the figure, and means for rotating the cart wheels and oscillating the legs of the figure, and means for varying the degree of oscillatory movement imparted to the legs of the figure, said means including a manually operable element mounted on the cart adjacent the driver's seat.

2. A velocipede comprising a cart, an animal figure attached thereto and having its legs pivotally attached to its body, wheels supporting the cart and the figure, and means for rotating the cart wheels and oscillating the legs of the figure, and steering means for the wheel supporting the figure, said last means comprising a rotatable post on which the said wheel is journaled, a cross bar fixed to said post and extending through a transverse slot in the body of the figure, a second cross bar journaled in the cart, ropes connecting said cross bars, and a handle fixed to said second cross bar.

3. A velocipede comprising a cart, an animal figure attached thereto and having its legs pivotally attached to its body, propelling means for the cart, and means for imparting oscillatory movement to the legs of the figure, said means including rock arms, and crosshead blocks adjustable along said rock-arms.

4. A velocipede comprising a cart, an animal figure attached thereto and having its legs pivotally attached to its body, propelling means for the cart, and means for imparting oscillatory movement to the legs of the figure, said last means including rock-arms, a tubular shaft on which said rock-arms are pivoted, a second shaft extending through said tubular shaft, crosshead blocks slidable on said arms, connections between said crosshead blocks and the legs of the figure, screws carried by said rock-arms and threaded through said crosshead blocks, gear connections between said screws and second shaft, and means for rotating said second shaft.

In testimony whereof I have affixed my signature.

PETER DENISOW.